Patented Nov. 17, 1942

2,302,557

UNITED STATES PATENT OFFICE 2,302,557

RUBBER PRODUCT

Carl M. Langkammerer, Wilmington, Del., assignor to E. I. du Pont de Nemours & Company, Wilmington, Del., a corporation of Delaware No Drawing. Application March 14, 1941.
Serial No. 383,443

17 Claims. (Cl. 117—76)

This invention relates to rubber articles and more particularly to improvements in surface-coated rubber products.

A large variety of film-forming materials, including cellulose esters, oil varnishes, shellac, phenol-aldehyde resins and other synthetic resinous compositions have been used as protective and decorative coatings on rubber surfaces. In spite of the large amount of work done in this field the coated rubber products previously available have been deficient in one or more of the requirements of flexibility, adhesion of the finish to the rubber base, insufficient toughness, as evidenced by crocking on bending, and poor durability on outdoor exposure. Coatings which dry by oxidation, e. g., those containing drying oils, continue to polymerize and oxidize after application with resultant loss in elasticity. Antioxidants present in the rubber undesirably prolong drying time of such coating compositions and driers added to the coating composition to accelerate drying, adversely affect the aging properties of the rubber base.

Some improvement is obtained with coatings drying solely by solvent evaporation, but those which will adhere to the rubber do not withstand the degree of scrubbing and flexing required in upholstery and other fabrics subject to severe usage. For example, rubber products coated with cellulose nitrate, acrylic acid ester resins, etc., which are representative of the advances made in the art toward the goal of developing the ideal rubber finish, are still far from being entirely satisfactory in such important requirements as scrub resistance, toughness, and flexibility. Attempts to develop clear coatings based on resins have not been entirely successful because of severe discoloration on aging, particularly in the presence of light.

This invention has as an object the production of rubber articles having an improved finish. A further object is the manufacture of artificial leather products comprising rubber coated fabrics, the rubber surface of which carries a strongly adherent protective coating which is highly resistant to abrasion. Other objects will appear hereinafter.

I have discovered that the adhesion to rubber surfaces of coatings comprising phenol-aldehyde resins is markedly improved by conditioning the rubber surface by treatment with a halogen or other indurating agent. A rubber coated fabric obtained in this manner by application of this resin coating over the halogen-hardened rubber surface will withstand, for unusually long periods, such severe usage as is received by upholstery in heavy duty trucks and tractors.

The preferred phenol-aldehyde resins for use in the practice of my invention are those of the thermosetting type and are used in their partially reacted or condensed form, known as resoles. Although the phenol-formaldehyde resin can be used alone, this procedure is not necessary since but as little as 5% thereof improves the adhesion to the halogen-hardened rubber surface of compositions containing other film-forming materials which, for the best results, are those not subject to further chemical or physical change. Among the most useful combinations are the compatible blends comprising a film-forming material and from about 10% to about 40% of phenol-aldehyde resin. Film-forming materials compatible with the phenol-aldehyde resoles include cellulose esters, polyamides, alkyd resins, particularly those modified with non-drying oils, and vinyl type resins. By "vinyl type resins" as used herein is meant the class of resins obtained by polymerizing organic compounds having the formula

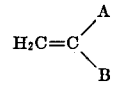

wherein A is selected from the class consisting of hydrogen, halogen, and hydrocarbon radicals, and B is selected from the class of halogen and organic radicals containing a carbon atom joined to another atom by a plural bond, the carbon atom being removed from $H_2C=C=$ radical by not more than one atom. Typical examples are the polyvinyl esters, polyvinyl halides, polyvinyl acetals, polyvinyl ethers, polyacrylic and polymethacrylic acids, esters, nitriles, and amides, etc.

The manner in which the films are formed exerts a certain amount of influence on their clarity. The most satisfactory method of applying the resinous films is from solution in common organic solvents. Emulsions or dispersions can also be used. Air-dried films function quite well, but best results are obtained by baking. All of the commonly known methods of coating can be used for applying the resinous film to the halogen-hardened rubber surfaces.

The invention is further illustrated by the following examples in which the parts are by weight.

Example I

A rubberized fabric comprised of a cotton sateen with an anchor coat of rubber cement is overlaid with a calender coat of a pale crepe rubber composition. A 4% sulfur chloride solution is brushed on the surface of the unvulcanized calender coat and, after standing an hour, is given a neutralizing treatment by hanging an hour in an atmosphere of ammonia. A 56% solids solution of a commercial phenol-formaldehyde resole, coded BV-1680 by the Bakelite Corporation, is diluted to a solids concentration of 8% with denatured ethyl alcohol and brushed onto the treated rubberized fabric. After most of the solvent is evaporated the product is heated in an oven at 127° C. for 2¼ hours.

The product of the above example has remarkable resistance to abrasion, scuffing, and scrubbing. A similar product in which the sulfur chloride treatment is omitted does not resist abrasion. When scratched with the finger nail the product made according to this example is practically unchanged while the product in which the sulfur chloride treatment is omitted turns white in the places where it is scratched. In addition the adhesion of the film to the rubber base is much better in the sulfur chloride treated sample than in the untreated sample.

A particularly useful phenolic resole for the present purpose is that obtained by reacting formaldehyde with the phenol 2,2-di-(4-hydroxyphenyl)-propane which for best results should be used in a relatively pure form. The condensation with formaldehyde (4 moles) is carried out by charging the reaction vessel with:

| | Parts |
|---|---|
| 2,2-di-(4-hydroxyphenyl)-propane | 228 |
| 37% aqueous formaldehyde solution | 280 |
| 50% aqueous sodium hydroxide | 10 | heating to 80° C., and holding the reaction mixture at this temperature with stirring for about 2½ hours. It is important that the reaction be stopped at the proper point since, if carried too far, the resin becomes less compatible with other resinous materials, and if it is not carried far enough the yield of resin is cut down by solution in the wash water.

Since uncontrollable factors in this resin reaction cause it to proceed at different rates in duplicate reactions, products differing rather widely can be obtained. A very convenient test for determining the proper end point of the reaction is as follows: Samples of the reaction mixture are taken at intervals as the reaction proceeds, cooled until they become cloudy, then warmed slowly and the temperature noted at which they become clear. This temperature (the clear point) increases slowly as the reaction proceeds. The most satisfactory products for use in the present invention are those obtained when the reaction is stopped when the clear point has reached 45° to 55° C. As mentioned above, if the reaction is carried out at 80° C. the time required for this point to be reached is approximately 2½ hours; if the reaction is carried out at 95° C. the time required is only about ½ hour. When the clear point of the reaction mixture has reached the desired point, the reaction is stopped by the addition of 750 parts of cold water. The reaction mixture is then neutralized with dilute hydrochloric acid, the resin layer washed by stirring for ½ hour, the water siphoned off, and the washing process repeated twice more using 750 parts of cold water each time. The excess water is then removed by warming the resin to 50° to 60° C. at a pressure of 10 to 20 mm. After removal of the water, 250 parts of denatured alcohol are added to give a resin solution containing approximately 50% solids.

Example II

The coating composition applied to the surface-hardened rubberized fabric is of the following composition:

| | Parts |
|---|---|
| Phenol-formaldehyde resole described above (50% solids in denatured alcohol) | 96 |
| Polyacrylic ester solution | 720 |
| Delusterant | 162 |
| Ethyl acetate | 144 |

The polyacrylic ester solution is a 20% solution in ethyl acetate of a polyacrylic ester, consisting essentially of polymethyl acrylate.

The delusterant is a suspension of 21 parts of silica and 9 parts zinc stearate ground in a mixture of isobutyl acetate and amyl acetate.

The rubberized fabric used is similar to that described in Example I except that it is vulcanized for 2 hours at 276° F. after coating the calender coat with shellac and embossing. A 6% solution of sulfur chloride is roller coated over the vulcanized surface and neutralized as before. After applying two coats of the above described composition of resole and the above polyacrylic ester solution with a doctor knife over the halogen-hardened rubber surface, the product is suspended in a heater and baked for one hour at 250° F. in the presence of ammonia.

The product of the above example, an artificial leather for use in upholstering, shoe uppers, bags and cases, shows high resistance to the abrasion, flex and scrub tests to which such materials are usually subjected. Compared with an uncoated rubberized fabric designed for the same uses and finished with sulfur chloride and bromine, the present product has the following advantages: (1) better resistance to hydrocarbon liquids such as gasoline, kerosene and fuel oil; (2) better resistance to wear, this latter advantage being particularly noticeable in upholstery constructions using a beading; the beading is subjected to an extreme amount of wear and in service beading constructed with the present product lasts much longer than that made with a corresponding uncoated product; (3) better resistance to wet-crocking, particularly after exposure. Ordinary rubberized fabrics after outdoor exposure when rubbed with a wet cloth discolor the cloth, presumably because of chalking. The coated products described herein do not discolor a wet cloth in this manner, even after prolonged exposure.

A coating composition differing from that in the foregoing example only in the omission of the phenol-formaldehyde resole is applied to the same halogen treated rubber-coated fabric base in the same manner. Omission of the phenol-formaldehyde resole decreases the adhesion of the film to the rubber base. In another experiment the composition of Example II is applied to the same rubber base with the exception that the sulfur chloride treatment is omitted. Although the adhesion of the coating is satisfactory for many uses, it is markedly inferior to the product of Example II. The difference in adhesion is even greater when the films are wet.

Relatively weak sulfur chloride treatments, as for instance a 3% solution, also markedly improve the adhesion of the phenol-formaldehyde resole composition to the rubber, although the effect is not quite equal to that obtained with a stronger sulfur chloride solution as in the above example.

The coating composition described in Example II is diluted with 1000 parts of ethyl acetate and sprayed on a similar rubberized fabric, except that the base is indurated by treatment with 6% sulfur chloride, followed by a treatment with a solution containing 6% sulfur chloride and 3% of bromine. In this procedure the final baking step is omitted. Even so, the product has satisfactory adhesion and is entirely resistant to crocking.

*Example III*

The rubberized fabric described in Example II, is treated twice with a 6% sulfur chloride solution and festooned in a chamber containing ammonia vapors. To the product thus prepared is applied, by a doctor knife, two coats of a composition consisting of

| | Parts |
|---|---|
| Polymethyl acrylate solution (10% solids) | 40 |
| Phenol-formaldehyde resole solution described in Example I | 2.5 |
| Delusterant described in Example II | 4.5 |

The product obtained by baking for 15 minutes in the presence of a small amount of ammonia is similar to that described in the preceding example.

*Example IV*

A surface-hardened vulcanized rubber-coated fabric obtained by the procedure described in Example I is coated with a pigmented composition made by milling the following ingredients:

| | Parts |
|---|---|
| Polyacrylic ester consisting essentially of polymethyl acrylate | 72 |
| Phenol-aldehyde resole of Example I | 9.2 |
| Ethyl acetate | 25 |
| Copper phthalocyanine pigment | 5 |

The copper phthalocyanine pigment known as "Monastral" fast blue BSN powder is prepared as described in U. S. Patent 2,197,458.

This enamel, after diluting with 100 parts of ethyl acetate and 2 parts of cellosolve acetate is applied to the rubber base by spraying. Several coats are required to give satisfactory coverage. The product is heated at 115° C. for 15 minutes to harden the coating thoroughly. The finished material has excellent appearance and the pigmented resin film is very flexible, tough, and has excellent adhesion to the rubber base.

The product of the above example is superior to the unpigmented composition in durability, and is equal to the product of Example II with respect to adhesion of the film, abrasion, flex and scrub resistance. The product has a slight tendency to chalk on outdoor exposure. This shortcoming, however, is remedied, without adversely affecting other properties, by the application of two coats of the unpigmented composition described in Example II.

A number of useful compositions comprising phenol-formaldehyde resoles modified with various other film-forming materials are shown in the following examples. In all cases these compositions when applied to the indurated rubberized fabric material described in Example II give products having exceptional properties, particularly when given a short bake after application.

*Example V*

| | Parts |
|---|---|
| A 50% solids solution in toluene of 25% hydrogenated cocoanut oil-modified glycerol phthalate resin formulated with 9% excess glycerol and having an acid number of 24 | 360 |
| The 50% solids phenol-formaldehyde resole solution described in Example I | 40 |
| Xylene | 80 |
| Denatured alcohol | 80 |

*Example VI*

| | Parts |
|---|---|
| A 49% solids solution in xylene of a 43% castor oil-modified glycerol phthalate resin formulated with 6% excess glycerol | 280 |
| The 50% solids phenol-formaldehyde resole solution described in Example I | 120 |
| Xylene | 80 |
| Denatured alcohol | 80 |

*Example VI-A*

| | Parts |
|---|---|
| A 49% solids solution in xylene of a 43% castor oil-modified glycerol phthalate resin formulated with 6% excess glycerol | 290 |
| Denatured alcohol | 430 |
| A solid thermoplastic phenol-formaldehyde resin made by condensing 0.5 moles of formaldehyde with 1 mole of 2,2-di-(4-hydroxyphenyl)-propane with a formic acid catalyst | 96 |
| The delusterant used in Example II | 162 |
| Ethyl acetate | 144 |

*Example VII*

| | Parts |
|---|---|
| Iron blue | 21 |
| Butyl phthallyl butyl glycollate | 23.3 |
| Diphenylol octadecane obtained by condensing 1,12-octadecanediol and phenol by means of $AlCl_3$ | 35 |
| A superpolyamide made by condensing 40 parts hexamethylene diammonium adipate, 30 parts hexamethylene diammonium sebacate and 30 parts of caprolactam | 87.4 |
| Denatured alcohol | 170.8 |

The above composition is ground in a pebble mill until the desired degree of dispersion is obtained. To 100 parts of the pigmented composition thus obtained is added 20 parts of the 50% solids phenol-formaldehyde resole solution described in Example I. To obtain a solution with good spraying characteristics the solution is diluted with 250 parts of denatured alcohol.

*Example VIII*

| | Parts |
|---|---|
| Ethyl cellulose having an ethoxyl content of 48.8% | 180 |
| The 50% solids phenol-formaldehyde resole solution described in Example I | 40 |
| Denatured alcohol | 1800 |

*Example IX*

| | Parts |
|---|---|
| Polyvinyl butyral (condensation product of polyvinyl alcohol and isobutyraldehyde) | 180 |
| The 50% solids phenol-formaldehyde resole solution described in Example I | 40 |
| Denatured alcohol | 1780 |
| 85% phosphoric acid solution | 0.5 |

Example X

| | Parts |
|---|---|
| Cellulose acetate-butyrate | 50 |
| Dixenyl monophenyl phosphate | 20 |
| The 50% solids phenol-formaldehyde resole solution described in Example I | 60 |
| Ethyl acetate | 185 |
| Butyl acetate | 185 |

The invention can be applied advantageously to the production of improved coated rubber articles other than rubber coated fabrics. The following example illustrates the coating of a golf ball.

Example XI

A solution of the following ingredients is made by heating and stirring:

| | Parts |
|---|---|
| A superpolyamide made by condensing 40 parts of hexamethylene diammonium adipate, 30 parts of hexamethylene diammonium sebacate and 30 parts of caprolactam in a known manner | 72 |
| The 50% solids phenol-formaldehyde resole solution described in Example I | 48 |
| Water | 48 |
| Denatured alcohol | 432 |
| Butyl phthallyl butyl glycollate | 6 |
| Diphenylol octadecane obtained by condensing 1,12-octadecanediol and phenol by means of an aluminum chloride catalyst | 9 |

After homogeneity has been effected the solution is placed in a pebble mill with 72 grams of titanium dioxide and ground for 12 hours to obtain proper dispersion. An unpainted golf ball which has been given a chlorine treatment is coated with this enamel by dipping. The coating is dry and tack-free at the end of ½ hour. The air dried polyamide-containing film has excellent adhesion, there being no indications of peeling after 18 holes of actual play. This coating has an added advantage over the usual oil-base enamels in that it employs solvents which do not soften rubber.

Ordinary oil-base enamels which dry in 4 hours over glass require 18 hours to dry on the golf ball due to the inhibiting effect of the antioxidants present in the rubber. Oil-base enamels made with hydrocarbons require an extremely long time to obtain proper through-hardness as contrasted with surface hardness because the hydrocarbon solvents soak into the rubber and are removed only very slowly by air drying. The present enamels do not suffer this defect because for the most part they are made up without hydrocarbon solvents.

The polyamide of the above example can be replaced by other polymers of this kind, such as described in U. S. Patents 2,071,253 and 2,130,948. The phenol-aldehyde resins used in the present invention should preferably be soluble in organic solvents although dispersions of insoluble resins can be used. Among the useful phenol-formaldehyde resins are those of the thermoplastic type prepared by reacting formaldehyde with such phenols as o-cresol, p-tertiary-butylphenol, 2,2-di(4-hydroxy-3-methylphenyl)-propane, 4-hydroxy-diphenyl, and p-hydroxyacetophenone. These phenols have two reactive positions, that is two unsubstituted carbon atoms holding a hydrogen atom ortho or para to a phenolic hydroxyl group. The most desirable phenol-aldehyde resins for the present purpose, however, are the resoles formed by partially reacting a phenol having three or more reactive positions with formaldehyde. Such phenols include phenol itself, meta-cresol, resorcinol, sym.-xylenol, p,p'-dihydroxydiphenyl, 2,2-di-(4-hydroxyphenyl)-propane, 2,2-di-(4-hydroxyphenyl)-cyclohexane and 2,2-di-(4-hydroxy-2-methylphenyl)-propane. The phenol-aldehyde resoles may be prepared by any of the known methods. An example of such a preparation, using an alkaline catalyst and a low temperature is described in U. S. Patent 1,614,172. Another example is given in Example VI—A of this specification. Of the heat-reactive resoles tested those prepared from dihydric phenols having four reactive positions have been found most suitable. These phenols are obtained by condensing a phenol having no substituents in the ortho and para positions with an aldehyde or ketone. In place of formaldehyde other aldehydes can be used, e. g., propionaldehyde, butyraldehyde, furfuraldehyde, etc. The preferred aldehyde, however, is formaldehyde.

As previously indicated the best results are obtained by including with the phenolic resin various film-forming materials which are unchanged on moderate heating or exposure to air. Materials of this kind in addition to those mentioned which dry by solvent evaporation include polymers of ethyl acrylate and higher aliphatic esters of acrylic and methacrylic acids, including interpolymers of these materials; after chlorinated polyvinyl chlorides of the kind commercially known as "Igelite PC"; polyvinyl acetate and polymers of vinyl esters of higher aliphatic acids, as well as their partially hydrolyzed products; polyvinyl phenyl ethers; benzyl cellulose and other ethers and mixed ethers of cellulose; cellulose acetate, cellulose acetate-propionate, cellulose acetate-butyrate and other esters and mixed esters of cellulose; polymers of N-vinyl compounds such as vinyl carbazole; polymers of vinyl ethers; polymers and interpolymers of acrylonitrile; polyvinyl acetal, polyvinyl formal and polyvinyl butyral; glyceryl phthalate resins particularly those modified with non-drying oils, e. g. cocoanut oil, castor oil, and various hydrogenated oils; polymers and interpolymers of vinyl halides such as polyvinyl chloride, polymeric 1,2-dichloroethylene, interpolymers of vinyl chloride and vinyl acetate, etc.; polyamides, including interpolyamides and polyester amides.

It is generally desirable that the modifying resin be compatible with the phenol-formaldehyde resin on air drying and also on baking, but this is not entirely essential for the purposes of this invention. Films from compatible blends usually have better physical properties than opaque, incompatible, films. There are, however, cases in which a very desirable dull luster can be obtained by partial incompatibility of the resinous components. Practically all of the examples given are completely compatible. It should be remembered that compatibility rests not only with the resins but that by choosing the proper solvent or solvent combination it is possible to prepare clear films which otherwise would be opaque.

The coating composition can include in addition to the phenol-aldehyde resins and modifying resins a variety of other materials, such as pigments, fillers, dyes, extenders, antioxidants, catalysts, plasticizers, etc. Any of the materials usually employed as catalysts in phenol-aldehyde resins, e. g. hexamethylenetetramine, oxalic acid, or phosphoric acid, can be used in the preparation of these resins. In formulating these resinous compositions it has been found particularly advantageous to use phosphoric acid as a catalyst. In addition to functioning as a catalyst its use also allows the production of lighter colored films.

Although air-dried films have good adhesion to the halogen-hardened rubber surfaces, improved adhesion can be obtained by baking the resinous film applied over rubber. The baking temperature can vary over a wide range depending on the particular coating composition and on whether or not a catalyst is used. The temperature can vary from about 90° C. to about 200° C. The time of baking is dependent in turn on the temperature of bake. At lower temperatures baking may extend over periods of several hours while a few minutes is sufficient at the higher temperature. Stabilizing agents can be incorporated in coating compositions which are to be baked. The films applied can vary in thickness from 0.0001 inch to 0.003 inch, the usual thickness being in the neighborhood of one mil.

In place of sulfur chloride other known rubber indurating agents can be used, e. g. sulfur bromide, stannic chloride and other amphoteric metal halides, boron halides in combination with an aldehyde, etc. Rubber surfaces which have been so treated are referred to herein as "halogen-hardened." The rubber surface is usually vulcanized before treatment with the hardening agent, but this procedure is not necessary. The present invention is effective, and is in fact desirably applied, to halogen-hardened rubber surfaces to which a thin film of a resin, such as shellac, has been applied prior to the hardening treatment. The thin film of resin moderates the action of the hardening agent. The term "halogen-hardened rubber surfaces" is intended to include such resin-coated rubber surfaces which have been subjected to a hardening treatment.

The coating compositions of this invention can also be applied to rubber surfaces which have been partially coated with other resinous films. Thus two-tone products can be made by applying a color coat to the embossed fabric, scraping the varnish from the ridges of the embossing, drying, and then applying a clear coat of a composition coming within the scope of this invention over the base color coat.

This invention provides a method for obtaining rubber articles provided with a protective coating of unusual durability and of exceptionally high adherence, abrasion and oil resistance.

The finishing operation described in the present invention is useful in the manufacture of a wide variety of rubber articles such as: rubber coated fabrics, balloon fabrics, upholstered materials, patent leather substitutes, chemically resistant aprons, gas mask fabrics, raincoats and hospital sheeting; molded rubber articles, particularly those subjected to the action of oils or sunlight, such as engine mounts, windshield wipers, and other molded rubber parts on automobiles and airplanes; conduits for organic liquids particularly liquids which attack rubber such as gasoline hose and tubing for dispensing fuel oil; and rubber coated insulated electrical conductors.

As many apparently widely different embodiments of this invention may be made without departing from the spirit and scope thereof, it is to be understood that I do not limit myself to the specific embodiments thereof except as defined in the appended claims.

I claim:

1. An article of manufacture which comprises rubber having a halogen-hardened surface overlaid with an adherent baked film comprising a phenol-aldehyde resin.

2. An article of manufacture which comprises a rubber coated fabric, the rubber surface of which is halogen-hardened and overlaid with an adherent baked film comprising a phenol-aldehyde resin.

3. The article set forth in claim 1 in which said film comprises a mixture of a phenol-aldehyde resin and a film-forming material selected from the group consisting of vinyl resins, synthetic linear polyamides, organic cellulose esters and ethers, and non-drying oil modified polyhydric alcohol-polycarboxylic acid esters.

4. The article set forth in claim 2 in which said film comprises a mixture of a phenol-aldehyde resin and a film-forming material selected from the group consisting of vinyl resins, synthetic linear polyamides, organic cellulose esters and ethers, and non-drying oil modified polyhydric alcohol-polycarboxylic acid esters.

5. An article of manufacture which comprises rubber having a halogen-hardened surface overlaid with an adherent baked film comprising a phenol-formaldehyde resin.

6. An article of manufacture which comprises a rubber coated fabric, the rubber surface of which is halogen-hardened and overlaid with an adherent baked film comprising a phenol-formaldehyde resin.

7. The article of claim 1 wherein the phenol-aldehyde resin is a condensation product of formaldehyde and a dihydric phenol having four reactive positions.

8. The article of claim 2 wherein the phenol-aldehyde resin is a condensation product of formaldehyde and a dihydric phenol having four reactive positions.

9. An article of manufacture which comprises rubber having a halogen-hardened surface overlaid with an adherent baked pigmented film comprising a phenol-aldehyde resin.

10. The article set forth in claim 5 in which said resole is 2,2-di-(4-hydroxyphenyl)-propane-formaldehyde resin.

11. The article set forth in claim 6 in which said resole is 2,2-di-(4-hydroxyphenyl)-propane-formaldehyde resin.

12. An article of manufacture which comprises rubber having a halogen-hardened surface overlaid with an adherent baked pigmented film comprising a phenol-formaldehyde resin.

13. The article set forth in claim 2 in which said film comprises a mixture of 2,2-di-(4-hydroxyphenyl)-propane-formaldehyde resin and polymethyl acrylate resin.

14. A process for making artificial leather products from fabrics having a calender coat of unvulcanized rubber, said process comprising applying a thin coat of shellac over the calender coat, vulcanizing the rubber calender coat, treating the vulcanized rubber coat with a halogen-hardening agent, neutralizing said agent, and applying over the surface hardened rubber a coating comprising 30 parts of 2,2-di-(4-hydroxyphenyl)-propane-formaldehyde resin blended with 70 parts of polymethyl acrylate, and baking the resulting product.

15. The article set forth in claim 1 in which said resin is a partially condensed phenol-formaldehyde resin.

16. A process for making artificial leather products which comprises hardening the rubber surface of a rubber coated fabric by treatment with a halogen, applying over the surface hardened rubber a coating comprising phenol-aldehyde resin, and then baking the resulting product.

17. The process set forth in claim 16 in which said resin is a partially condensed phenol-formaldehyde resin.

CARL M. LANGKAMMERER.